June 18, 1963 D. R. BARBER 3,094,688

DECODING EQUIPMENT

Filed Feb. 11, 1960

Inventor
D. R. BARBER
By C. H. Suydam
AGENT

United States Patent Office 3,094,688

Patented June 18, 1963

3,094,688
DECODING EQUIPMENT

Donald Robert Barber, London, England, assignor to International Standard Electric Corporation, New York, N.Y.

Filed Feb. 11, 1960, Ser. No. 8,056
Claims priority, application Great Britain Feb. 23, 1959
5 Claims. (Cl. 340—174)

The present invention relates to electric pulse decoders intended for use in pulse code modulation communication systems which employ a binary code.

The simple form of the binary code in which successive digits are of increasing or decreasing significance can be directly decoded by supplying the digit pulses to a weighting network. This is the usual method of decoding, and where for some other reason the transmitted code is not in the simple binary form it is common practice to convert it to this form in some suitable way before decoding.

This usual decoding method has the disadvantage that the information carried by a code group of pulses is lost or destroyed by the decoding, and accordingly the object of the present invention is to overcome this difficulty by providing an improved decoding arrangement in which the information carried by a code group of pulses is stored and can be utilized without destruction. One advantage of this facility is that in a multichannel system in which each channel is provided with an individual decoder, the information carried by a code group of pulses can be utilized continuously throughout the blank interval until the next code group is received, thereby increasing the decoding efficiency.

The object of the invention is achieved by taking advantage of the properties of a magnetic core device known as a "transfluxor."

The invention accordingly provides an electric pulse decoder comprising a core of square-loop ferromagnetic material having two parallel holes passing therethrough, means for passing a current through a winding threading the first hole in such manner as substantially to saturate all the magnetic material of the core, means for applying a group of digit pulses representing an electrical sample to reverse the saturation flux of a ring of the material immediately surrounding the first hole in such manner that the width of the ring is substantially proportional to the magnitude of the sample, the width being always less than the shortest distance between the peripheries of the holes, means for applying a sampling signal to a first winding threading the second hole and means for deriving from a second winding threading the second hole an output pulse whose amplitude is substantially proportional to the magnitude of the sample.

The invention will be described with reference to the accompanying drawings, in which.

Figure 1:
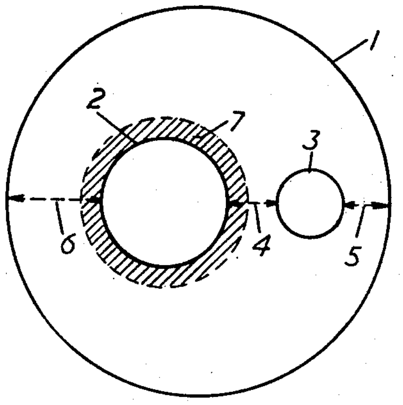
FIG. 1 shows a plan view of a transfluxor device employed in an embodiment of the invention.
Figure 2:
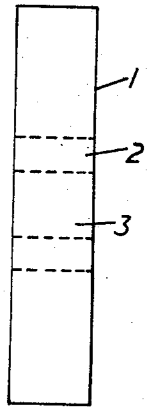
FIG. 2 shows a side elevation of the transfluxor.

The invention employs a magnetic device which has been called a "transfluxor," an example of which is illustrated in FIGS. 1 and 2. It comprises a core 1 of suitable "square loop" ferrite or other ferromagnetic material in which the remanent flux after saturation is substantially equal to the saturation flux, and in which the coercive force is appreciable. The core 1 is in the form of a block or disc provided with two holes 2, 3, one of which is larger than the other. Preferably the disc and holes should be circular as shown, and the widths of the material at 4 and 5 should preferably be approximately half the width at 6. The centers of the three circles can conveniently be on the same straight line, as shown, though this is not essential.

The core 1 is provided with certain windings not shown in FIGS. 1 and 2 threaded through one or other of the holes 2 and 3. An important property of the device is that if a large current be passed through a winding threaded through the hole 2 sufficient to saturate the magnetic material completely in a clockwise direction, then the two limbs on either side of the hole 3 are both saturated with flux in the downward direction, and this means that there can be no inductive coupling between two windings threaded through the hole 3 because no flux change circulating round the hole 3 can be set up, since the limbs on either side are both saturated. The transfluxor is said to be "blocked" in this condition.

Now if a moderate setting current be passed through the winding which threads the hole 2 in the opposite direction to the initial blocking current, it can cause the saturation in the anticlockwise direction of part of the material surrounding the hole 2, as indicated by the shaded area 7, the flux in this area being now in the upward direction in the region between the holes 2 and 3. This is because, in order to reverse the saturation of the material, the magnetic field applied must be at least equal to the coercive force $H_c$, and the field applied by a given current is inversely proportioned to the path length in the material. Thus, the shaded area 7 over which the saturation of the material is reversed is approximately circular and has a radius substantially proportional to the setting current. After this reversal of the saturation of part of the material, coupling is possible between two windings threaded through the hole 3, and the degree of coupling is substantially proportional to the width of the shaded area 7.

Figure 3:
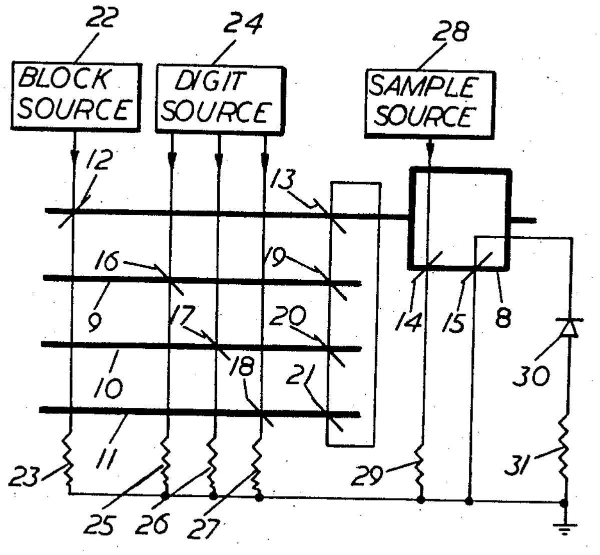
FIG. 3 shows a schematic circuit diagram of an embodiment of the invention.

A decoding circuit according to the invention is shown in FIG. 3. This is for a three-digit binary code, but the arrangements can be extended in an obvious manner for a code of any number of digits. In this figure the transfluxor 1 of FIG. 1 is shown diagrammatically as a horizontal straight rod having a loop 8 which represents the hole 3. Windings which link the hole 2 of FIG. 2 are shown as short inclined lines on the rod portion, and windings which link the hole 3 are shown as inclined lines on the loop portion 8.

In FIG. 3 there are also provided three digit cores 9, 10 and 11 which may be of the same magnetic material as the transfluxor. These cores are ordinary toroidal cores shown diagrammatically as horizontal straight rods in FIG. 3, and provided with windings shown in the same manner as in the case of the transfluxor.

A winding line which slopes upwards to the left will be taken to represent the winding wound "straight" and one which slopes upwards to the right as one wound "reverse." A vertical straight line drawn through the intersection of a winding line with a core represents a conductor with which the winding is in series, and a current flowing downwards in such a conductor produces a flux from left to right in the core when the winding is wound "straight."

The main portion of the transfluxor 1 is provided with a blocking winding 12 wound reverse and a setting winding 13 wound straight. That is, windings 12 and 13 are threaded through the hole 2, FIG. 1. The loop portion 8 is provided with a sampling winding 14, and an output winding 15, both wound reverse. These windings are threaded through the hole 3. The cores 9, 10 and 11 are provided with digit windings 16, 17, 18 and output setting windings 19, 20, 21 all wound straight. A source 22 supplies positive blocking pulses to the winding 12 in series with a resistor 23, and a source 24 supplies positive pulses corresponding to digits 1, 2 and 3 respectively to windings 16, 17 and 18 in series respectively with resistors 25, 26, 27. The windings 13, 19, 20 and 21 are connected in series. A source 28 supplies sampling pulses to the sampling winding 14 in series with a resistor 29. Finally, the output winding 15 supplies output pulses through a rectifier 30 to an output load represented by a resistor 31.

The digit pulse combinations to be decoded generally arrive in sequence, and it will be assumed that the digit pulse source 24 includes conventional means whereby those digit pulses which are present in the combination appear simultaneously on corresponding ones of the three digit conductors connected to windings 16, 17 and 18. Just prior to the receipt of a code combination, a large blocking pulse is supplied from the blocking source 22 which restores the transfluxor to the fully blocked condition. Let it be assumed that the digit 1 pulse supplied to winding 16 corresponds to the most significant digit. This pulse triggers the digit core 9, which supplies a setting pulse of a predetermined volt-time product to the winding 13 of the transfluxor via output winding 19, which reverses the saturation of the area 7 of the transfluxor core (FIG. 1). The extent of this area is determined by the relative numbers of turns of windings 13 and 19, and these should be so chosen that, in the case of the digit 1 pulse, the radial width of the area 7 is half the width of the material at 4 between the holes 2 and 3. In like manner, the number of turns of the winding 20 should be so chosen that when the digit 2 pulse is supplied alone to winding 17, the width of the reversed area 7 is one-quarter of the width at 4; and the number of turns of the winding 21 should be so chosen that when the digit 3 pulse is supplied alone from the source 24 to the winding 18, the width of the area 7 is one-eighth of the width of the material at 4. Thus, it will be seen that when a code combination of digit pulses is supplied by the source 24 to the digit windings 16, 17 and 18, the total width of the area 7 of reversed saturation will be proportional to the signal amplitude which the code combination represents.

The transfluxor having been set by the combination of digit pulses as explained, it is now possible for a positive sampling pulse of sufficient amplitude supplied from the source 28 through the reverse winding 14 to restore the flux in the region 7 to the clockwise direction, and to reverse an equal area of the material in the region 5 so that the flux therein is in the upward direction.

A positive output pulse is thus generated by the winding 15, whose amplitude is proportional to the width of the area 7, and therefore to the original signal amplitude. A negative sampling pulse from the source 28 puts the transfluxor back in the original set condition and an equal negative output pulse is obtained. Thus, once the transfluxor has been set by a digit pulse combination, a train of alternately positive and negative output pulses can be obtained in response to a train of alternately positive and negative sampling pulses, the output pulses having amplitudes determined by the digit pulse combination.

It should be explained that the amplitude of the positive sampling pulse supplied from the source 28 should not exceed that necessary to reverse the saturation of the area 7, because if this pulse is large enough, it could produce an anticlockwise field which would be downwards in the region 6 which might unblock the whole transfluxor. However, the negative pulse could have any amplitude without detriment because the field produced in the region 6 would be upwards and the saturation flux is in this direction already. Thus, the negative sampling pulse can be made of large amplitude so that it supplies sufficient output power to the load 31, and the rectifier 30 is therefore directed so that it blocks the output pulse corresponding to the initial small positive sampling pulse, thus preventing any load on the transfluxor.

Once the transfluxor has been set, a train of output pulses of amplitude determined by the digit combination can be obtained indefinitely from the output winding 15. The transfluxor is subsequently reblocked by supplying a large blocking pulse from the source 22 which wipes out the reversed area 7 readying the transfluxor to be reset by the next digit combination. In reblocking the transfluxor, a pulse is generated by the winding 13 which resets the three digit cores 9, 10 and 11. No output is produced from the winding 15 on reblocking the transfluxor because the reblocking pulse does not produce any flux circulating round the hole 3.

Although the sources 22 and 28 are shown separate, since the blocking and sampling pulses must be synchronised they can clearly all be derived in some suitable way from a single source.

In the case of multichannel pulse code modulation communication systems, it is possible to provide either a single decoder according to FIG. 3 which is common to all the channels, or a separate decoder for each of the channels. In the first case, the decoded signal samples at the output of the common decoder are distributed to the respective channel circuits by conventional means, and in the second case, the incoming digit pulse combinations are distributed in a similar way to the respective channel decoders. In the first case there will probably only be time to apply one pair of sampling pulses to the winding 14 in order to obtain a single output pulse from the winding 15 which represents a signal sample. However, in the second case, each decoder is idle for nearly the whole of the sampling period, and it is therefore possible to supply a relatively long train of pairs of sampling pulses to the winding 14, so that a corresponding train of output pulses which represents the signal sample is obtained. The output power obtainable from the decoder is thus considerably greater than in the first case.

It will be clear to those skilled in the art that in the case of a decoder according to FIG. 3 for a code of $n$ digits, it will be necessary to provide $n$ digit cores similar to 9, 10 and 11, each with a digit winding and an output winding, and the number of turns of the output winding for the core corresponding to the $m$th digit should be so chosen that width of the region 7 produced by the $m$th digit alone is proportional to $\frac{1}{2}m$.

It should be pointed out that if the digit source 24 is so designed that in response to each incoming digit pulse it supplies to the corresponding digit winding 16, 17 or 18 a positive digit pulse followed after sampling by an equal negative digit pulse, the blocking source 22 and winding 12 can be dispensed with, since the negative digit pulses will exactly wipe out the effect on the transfluxor of the positive digit pulses, and at the same time will reset the digit cores.

While the principles of the invention have been described above in connection with specific embodiments, and particular modifications thereof, it is to be clearly understood that this description is made only by way of example and not as a limitation on the scope of the invention.

What I claim is:

1. An electric pulse decoder comprising a core of square-loop ferromagnetic material having two parallel holes passing therethrough, means for passing a current through a first winding threading the first hole in such manner as substantially to saturate all the magnetic material of the core, a source of a group of digit pulses representing an electrical sample, means for applying a current representing said group of digit pulses to a second winding threading said first hole to reverse the saturation flux of a ring of the material immediately surrounding said first hole, the width of said ring being substantially proportional to the magnitude of said sample and less than the shortest distance between the peripheries of said holes, means for applying a sampling signal to a first winding threading the second hole and means for deriving from a second winding threading said second hole an output pulse whose amplitude is substantially proportional to said magnitude.

2. An electric pulse decoder for decoding a code combination of digit pulses representing an electrical sample according to a binary code of $n$ digits, comprising a transfluxor core of square-loop ferromagnetic material having two parallel holes of unequal size passing therethrough, an input setting winding linking the larger hole, a sampling winding and an output winding linking the smaller hole, $n$ similar digit cores of square-loop ferromagnetic material, each digit core having a digit winding and an output setting winding, said input and said output setting windings being all connected in series, means for initially saturating all of the material surrounding the larger hole in such manner that there is no appreciable coupling between the sampling winding and the output winding, a digit pulse source arranged to supply digit pulses of a predetermined sign simultaneously to respective ones of the digit windings, according to a distribution determined by said code combination, in such manner as to trigger the corresponding digit cores whereby the saturation of a ring of the material of the transfluxor core surrounding the larger hole is reversed, the width of the ring being proportional to the magnitude of said sample but less than the shortest distance between the peripheries of the two holes, means for applying a sampling signal to said sampling winding, and means for deriving from said output winding in response to said sampling signal an output signal of amplitude substantially proportional to the magnitude of the sample.

3. A decoder according to claim 2 comprising a blocking winding threading said larger hole and means for applying a blocking pulse to said blocking winding for initially saturating all of said material.

4. A decoder according to claim 2 in which said sampling signal comprises a pair of sampling pulses consisting of a first pulse of appropriate sign and of sufficient amplitude again to reverse the direction of saturation of said ring of material followed by a second pulse of opposite sign and of greater amplitude than the first pulse.

5. A decoder according to claim 2, wherein said digit pulse source provides an output signal including a plurality of time sequential code combinations of digit pulses within a given time period, each code combination representing a signal sample of the signal of a different channel of a multichannel signal and said sampling signal comprises a plurality of time sequential pairs of sampling pulses within said given period, each pair being predeterminedly timed with respect to a different one of said code combinations for cooperation therewith to decode said code combinations and consisting of a first pulse of appropriate sign and of sufficient amplitude again to reverse the direction of saturation of said ring of material followed by a second pulse of opposite sign and of greater amplitude than the first pulse.

References Cited in the file of this patent

UNITED STATES PATENTS 2,884,622 Rajchman ------------- Apr. 28, 1959